United States Patent
Patel et al.

(10) Patent No.: US 7,846,494 B1
(45) Date of Patent: Dec. 7, 2010

(54) HEAT TRANSFER LABELING MANUFACTURING METHOD

(75) Inventors: Mukund R. Patel, Hudson, MA (US); Robert E. Lafler, Charlton City, MA (US)

(73) Assignee: Gotham Ink Corporation, Marlboro, MA (US)

( * ) Notice: Subject to any disclaimer, the term of this patent is extended or adjusted under 35 U.S.C. 154(b) by 0 days.

(21) Appl. No.: 11/562,544

(22) Filed: Nov. 22, 2006

Related U.S. Application Data

(62) Division of application No. 11/391,605, filed on Mar. 28, 2006, now Pat. No. 7,588,812.

(60) Provisional application No. 60/719,396, filed on Sep. 22, 2005.

(51) Int. Cl.
  *B05D 5/10* (2006.01)
  *B32B 9/00* (2006.01)
  *B32B 33/00* (2006.01)

(52) U.S. Cl. ............... 427/207.1; 427/208.4; 428/40.1; 428/41.7; 428/42.1; 428/42.2; 428/42.3

(58) Field of Classification Search ............ 427/101, 427/207.1, 208.2; 428/40.1, 41.7, 42.1–42.3
See application file for complete search history.

(56) References Cited

U.S. PATENT DOCUMENTS

| | | | |
|---|---|---|---|
| 3,259,507 A | 7/1966 | Smith | |
| 3,560,420 A | 2/1971 | Tamura et al. | |
| 4,426,422 A * | 1/1984 | Daniels | 428/352 |
| 4,548,857 A | 10/1985 | Galante | |
| 4,863,781 A | 9/1989 | Kronzer | |
| 4,865,901 A | 9/1989 | Ohno et al. | |
| 4,935,300 A | 6/1990 | Parker et al. | |
| 4,992,129 A | 2/1991 | Sasaki et al. | |
| 5,250,129 A | 10/1993 | Twele | |
| 6,017,636 A | 1/2000 | Tada et al. | |
| 6,099,944 A | 8/2000 | Laprade et al. | |
| 6,203,890 B1 | 3/2001 | Imamura et al. | |
| 6,344,269 B1 * | 2/2002 | Makar et al. | 428/349 |
| 6,731,319 B2 * | 5/2004 | Ichikawa et al. | 347/212 |

(Continued)

OTHER PUBLICATIONS

DuPont Spec. Sheet, DuPont Packaging & Industrial Polymers; DuPont Elvax 3200; E.I. du Pont de Nemours and Company, Inc.; Doc. Ref. 57nv3bwr.pdf, Jul. 2004; 3 pages.

(Continued)

*Primary Examiner*—Timothy H Meeks
*Assistant Examiner*—Cachet I Sellman
(74) *Attorney, Agent, or Firm*—Cowan, Liebowitz & Latman, P.C.; Mark Montague, Esq.

(57) ABSTRACT

A heat transfer label, a method of manufacturing a heat transfer label and a method of labeling untreated or minimally treated polyethylene, polypropylene polymers and polyethylene-polypropylene copolymer containers and sheets that are at room temperature or heated up to 180 degrees Fahrenheit, entail providing a heat transfer label that includes a support portion and a transfer portion over the support portion for transfer of the transfer portion from the support portion to the article upon application of heat to the support portion while the transfer portion is placed in contact with the article. The transfer portion comprises a single or multiple color design. The transfer portion then is transferred from the support portion to the article.

9 Claims, 1 Drawing Sheet

U.S. PATENT DOCUMENTS

| | | | |
|---|---|---|---|
| 6,753,050 B1 * | 6/2004 | Dalvey et al. | 428/32.12 |
| 6,793,989 B1 | 9/2004 | Patel et al. | |
| 6,902,641 B1 | 6/2005 | Patel et al. | |
| 2002/0064613 A1 * | 5/2002 | Kugo et al. | 428/35.2 |
| 2003/0134110 A1 * | 7/2003 | Laprade | 428/343 |
| 2005/0137303 A1 * | 6/2005 | Shelby et al. | 524/284 |

OTHER PUBLICATIONS

Elvax Spec. Sheet, Appendix Elvax Resin Grades; Ethylene/Vinyl Acetate Copolymers; 1 page (page 8) (date unknown).

Grade Selector Chart for Elvax Resins Ethylene/Vinyl Acetate Copolymers; 1 page; (date unknown).

Safety (MSDS) data for benzyl butyl phthalate; website: http://physcehm.ox.ac.uk/MSDS/BE/benzyl_butyl_phthalate.html; Dec. 21, 2006; 2 pages.

Spec. Sheet, Styrenic Plasticizers; North American Santicizer 160; Plasticizer Product Profile; http/www.ferro.com/Our+Products/Polymer+additives/Products+and+Makets/Styrenic; Dec. 21, 2006; 1 page.

Spec. Sheet, Unlplex 108 N-Ethyl o/p-Touluene Sulfonamide; 1 page (page 2 of 2)(date unknown).

Spec. Sheet, Tricresyl phosphate (TCP) ,from SinoHarvest Tricresyl Phosp; http://www.sinoharvets.com/products/Tricresvl-phosphate.shtml; (1 page)(Dec. 21, 2006).

DuPont Elvax, EVA resins, For Adhesives, Sealants, and Wax Blends; Jul. 20, 2005; pp. 1-8; Website (www.dupont.com) document.

Non-final Office Action dated Nov. 23, 2007 in related U.S. Appl. No. 11/562,545 (see Notice of References Cited).

Final Office Action dated Jul. 9, 2007 in parent U.S. Appl. No. 11/391,605.

The above reference was cited in a Jul. 21, 2008 US Office Action that issued in related U.S. Appl. No. 11/562,545, which is enclosed.

The above reference was cited in a Feb. 17, 2009 US Office Action that issued in related U.S. Appl. No. 11/391,605, which is enclosed.

The above references were cited in a Mar. 5, 2009 US Office Action that issued in related U.S. Appl. No. 11/562,545, which is enclosed.

* cited by examiner

HEAT TRANSFER LABELING MANUFACTURING METHOD

RELATED APPLICATION

This application is a division of U.S. application Ser. No. 11/391,605, filed Mar. 28, 2006 now U.S. Pat. No. 7,588,812, which claims the benefit of U.S. Provisional Application Ser. No. 60/719,396, filed Sep. 22, 2005. The disclosure of U.S. Provisional Application Ser. No. 60/719,396 is incorporated herein by reference.

BACKGROUND OF THE INVENTION

1. Field of the Invention

This application is directed to coating systems for applying labels to polyolefin bottles and other containers. More particularly, this application is directed to heat-activatable labeling systems formed using solvent-based adhesives containing blends of ethylene-vinyl acetate polymer resins tackified with polyamides, polyesters, polyterpenes, terpene phenolics, acrylics, aliphatic hydrocarbon resins, hydrogenated rosins and/or rosin esters and preferably plasticized by solid plasticizers. Other components of the label include pigmented resin design layers and an abrasion resistant coating.

2. Description of the Related Art

Current heat-activatable adhesives used on heat transfer labels for application to polyethylene and polypropylene containers, having a surface energy of approximately 30 dynes/cm do not bond well to those surfaces unless the plastic surfaces are highly oxidized by either flame or electrical discharge treatment to a level of 35 dynes/cm or above, or alternatively, unless a surface coating or tie-coat is applied to the substrate. Such treatments add to the cost of the labeling process by incurring added energy or raw material costs, reducing labeling production speeds and exposure of the labeling plant to fire and explosion hazards.

Further deficiencies in known labeling systems are lack of hot molten tack, poor bond-ability to untreated or minimally-treated polyolefin surfaces resulting in poor and unreliable adhesion particularly when the labeled item is exposed to extreme temperature or humidity conditions. Pressure sensitive labels, tacky at room temperature and requiring use of a disposable release liner, also are used for application to polyolefin containers.

OBJECTS OF THE INVENTION

It is an object of the invention to improve the quality of the label by providing a labeling system that does not require surface treatment of the substrate to be labeled nor other raw material or energy costs.

It is a further object of the invention to provide a method of producing abrasion-resistant, protective top coats, inks and heat activatable adhesive formulations that are used to produce labeled containers having better appearance, bonding and chemical resistance, as well as resistance to immersion for 20 to 40 minutes in cold or hot water ultrasonic baths.

SUMMARY OF THE INVENTION

In accordance with an embodiment of the present invention, a heat transfer label for flame treated, corona treated or untreated polyolefinic substrates comprises a support portion, and a transfer portion disposed over the support portion, the transfer portion being adapted to be transferred from the support portion to an article. The transfer portion includes an adhesive layer, an ink layer disposed on the adhesive layer, and an abrasion resistant topcoat disposed on the ink layer. The adhesive layer includes a solvent-based adhesive having a blend of ethylene-vinyl acetate polymers.

As an aspect of the present invention, the blend of ethylene-vinyl acetate polymers is tackified alone.

As another aspect of the present invention, the blend of ethylene-vinyl acetate polymers is tackified with at least one of the following resins: polyamides, polyesters, polyterpenes, terpene phenolics, acrylics, aliphatic hydrocarbon resins, hydrogenated rosins and rosin esters.

As a further aspect of the present invention, the ink and topcoat layers comprise an abrasion resistant ink of at least one color completely covering the adhesive layer.

As an additional aspect of the present invention, the adhesive layer further optionally includes a solid plasticizer.

As a feature of this aspect, the solid plasticizer includes at least one of the following: Glyceryl Tribenzoate, Dicyclohexyl Phthalate, Pentaerythritol Tetrabenzoate, and Toluene Sulfonamide-formaldehyde.

As yet a further aspect of the present invention, the adhesive layer is adapted to melt substantially between temperatures of 140 degrees and 217 degrees Fahrenheit.

As yet another aspect of the present invention, the adhesive layer contains the blend of ethylene-vinyl acetate polymers with a combination of tackifiers selected from the group consisting of polyamides, polyesters, polyterpenes, terpene phenolics, acrylics, aliphatic hydrocarbon resins, hydrogenated rosins and rosin esters and mixtures thereof.

As yet an additional aspect of the present invention, the transfer portion is adapted to be transferred to an article wherein edges of the transfer portion, after transfer to the article, are suitable to be spaced apart from one another, in direct contact, or overlapped with one another.

In accordance with another embodiment of the present invention, a method of manufacturing a heat transfer label comprises the steps of providing a support portion, providing an abrasion resistant topcoat over the support portion, providing an ink layer over the topcoat, and providing an adhesive layer of a solvent based adhesive having a blend of ethylene-vinyl acetate polymers over the ink layer. The adhesive layer, the ink layer and the topcoat representing a transfer portion adapted to be transferred from the support portion to an article.

As an aspect of this embodiment, the provided adhesive and/or topcoat layer is a solvent-based adhesive having a blend of ethylene-vinyl acetate polymers tackified alone.

As another aspect of this embodiment, the provided adhesive and/or topcoat layer is a solvent based adhesive having a blend of ethylene-vinyl acetate polymers tackified with at least one of the following resins: polyamides, polyesters, polyterpenes, terpene phenolics, acrylics, aliphatic hydrocarbon resins, hydrogenated rosins and rosin esters.

As a further aspect of this embodiment, the provided ink layer is a layer of abrasion resistant ink or ink manufactured from the resins describe in 0018 of at least one color that completely covers the topcoat.

As an additional aspect of this embodiment, the provided adhesive layer preferably includes a solid plasticizer.

As a feature of this aspect, the solid plasticizer includes at least one of the following: Glyceryl Tribenzoate, Dicyclohexyl Phthalate, Pentaerythritol Tetrabenzoate, or Toluene Sulfonamide-formaldehyde.

As yet another aspect of this embodiment, the provided adhesive layer is adapted to melt substantially between temperatures of 140 degrees and 217 degrees Fahrenheit.

As yet a further aspect of this embodiment, the provided adhesive and topcoat layer contain the blend of ethylene-vinyl acetate polymers with a combination of tackifiers selected from the group consisting of polyamides, polyesters, polyterpenes, terpene phenolics, acrylics, aliphatic hydrocarbon resins, hydrogenated rosins and rosin esters and mixtures thereof.

As yet an additional aspect of this embodiment, the transfer portion is adapted to be transferred to an article wherein edges of the transfer portion, after transfer to the article, are suitable to be spaced apart from one another, in direct contact, or overlapped with one another.

As still yet a further aspect of this embodiment, the provided ink layer is of an abrasion resistant ink prepared from the binder system.

As still yet another aspect of this embodiment, the provided adhesive layer is a solvent-based adhesive having a blend of ethylene-vinyl acetate polymers plasticized with a solid plasticizer, adapted to melt at temperatures substantially between 140 degrees and 217 degrees Fahrenheit, and dissolved in a blend of solvents adapted to dissolve the components and to obtain sufficiently low viscosity for application by gravure printing and coating equipment.

In accordance with a further embodiment of the present invention, a method of labeling an article comprises the steps of providing a heat transfer label as previously mentioned, applying to the support portion heat of a temperature substantially between 200 and 500 degrees Fahrenheit for less than one minute, providing an article to be labeled, placing, upon applying the heat, the transfer portion of the heat transfer label in contact with the article, transferring the transfer portion from the support portion to the article, and cooling the transferred transfer portion to room temperature.

As an aspect of this embodiment, the article is provided at room temperature so that the transfer portion is placed in contact with the article at room temperature.

As another aspect of this embodiment, the transfer portion is placed in contact with the article heated to substantially 180 degrees Fahrenheit.

As a further aspect of this embodiment, the provided article is made of a material selected from the group consisting of ethylene, propylene, copolymers thereof, polyester, polyvinyl chloride, and acrylonitrile-methyl acrylate copolymers, having a surface energy of substantially at least 30 dynes/centimeter.

As an additional aspect of this embodiment, the transfer portion transferred to the article is adapted to adhere to the article while edges of the transfer portion are spaced apart from one another, are in direct contact with one another, or overlap one another.

In accordance with yet another embodiment of the present invention, a method of labeling an article comprises the steps of providing a heat transfer label having a support portion, and a transfer portion over the support portion for transfer of the transfer portion from the support portion to the article, applying heat to the support portion, placing, upon applying heat, of 200 degrees to 500 degrees Fahrenheit for less than one minute, the transfer portion in contact with the article at room temperature or heated up to 180 degrees Fahrenheit the transfer portion comprising an abrasion resistant topcoat and printed areas of a single or multiple colors, abrasion resistant inks of single or multiple colors covering completely the adhesive coated area, or inks of a single or multiple color, the inks being prepared from the binder system described in the adhesive component of the label system made from separate adhesive and colored design layers, transferring the transfer portion from the support portion to the article, using as the adhesive component of the label a solvent based adhesive comprised of a blend of ethylene-vinyl acetate polymers, which can be tackified alone or with any of the following or combinations of the following: polyamides, polyesters, polyterpenes, terpene phenolics, acrylics, aliphatic hydrocarbon resins, hydrogenated rosins and rosin esters preferably plasticized with a solid plasticizer melting between 140 degrees and 217 degrees Fahrenheit and dissolved in a blend of solvents suitable for dissolving the components and obtaining sufficiently low viscosity for application by gravure printing and coating equipment, and cooling the applied label to normal room temperatures to develop outstanding adhesion and abrasion resistance, as well as chemical resistance to immersion for 20 to 40 minutes in cold or hot water ultrasonic baths.

As an aspect of this embodiment the adhesive layer contains a solid plasticizer selected from the group Glyceryl Tribenzoate, Dicyclohexyl Phthalate, Pentaerythritol Tetrabenzoate, and Toluene Sulfonamide-formaldehyde and mixtures thereof.

As another aspect of this embodiment, the adhesive layer contains a blend of ethylene-vinyl acetate polymers with a combination of tackifiers selected from the group consisting of polyamides, polyesters, polyterpenes, terpene phenolics, acrylics, aliphatic hydrocarbon resins, hydrogenated rosins and rosin esters and mixtures thereof.

Various other objects, advantages and features of the present invention will become readily apparent to those of ordinary skill in the art, and the novel features will be particularly pointed out in the appended claims.

BRIEF DESCRIPTION OF THE DRAWING

The following detailed description, given by way of example and not intended to limit the present invention solely thereto, will best be appreciated in conjunction with the accompanying drawing.

DETAILED DESCRIPTION OF PREFERRED EMBODIMENTS

Figure 1:
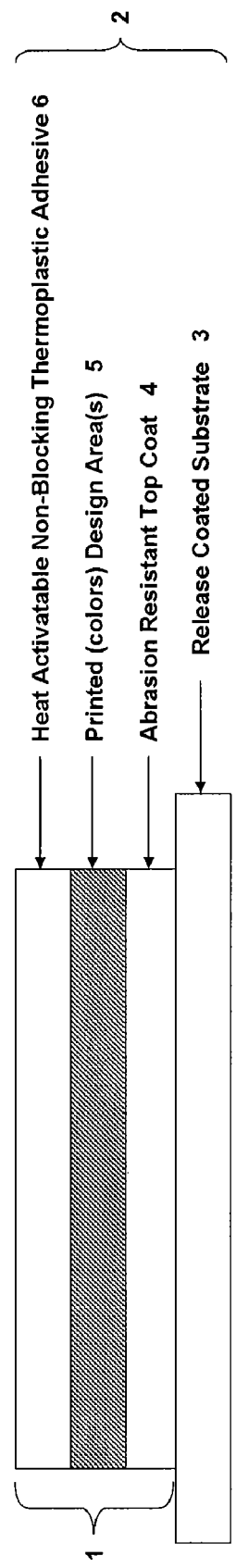
FIG. 1 is a schematic cross-section view of the label prior to application to the article.

The present invention is directed to non-blocking adhesive coatings suitable, upon being melted, for bonding to untreated polyethylene and polypropylene plastic surfaces without subjection of these surfaces to any type of flame treatment, electrical discharge corona treatment or prior application to these surfaces of any primer coating. The coatings are of sufficiently low viscosity to be applied by gravure coating methods, dried, then overcoated with a colored area or design, dried and subsequently covered with a hard abrasion resistant clear coating.

With reference to FIG. 1, which depicts a schematic representation of a cross sectional view of the label structure, the various layers are shown in the order of application to produce a heat transfer label 2 in accordance with the present invention. The heat transfer label 2 includes a multi-layer transfer portion 1 applied to and supported by a disposable release coated substrate 3 (also called a "support portion" herein). Specifically, the heat transfer label 2 comprises release coated substrate 3 (the support portion) on top of which has been applied an abrasion resistant topcoat 4, over which has been applied a printed (black and white or color) design 5 and a final heat activatable adhesive layer 6 that is tack-free and non-blocking at room temperature.

The adhesive solution, upon drying and subsequent exposure to temperatures of 200 degrees to 500 degrees Fahrenheit for less than one minute during the heat transfer process will develop adhesion to polyethylene, polypropylene, and ethylene-propylene copolymer substrates having inherent dyne levels below 35 dynes per centimeter, as well as those above this treatment level after being placed in contact with these substrates with or without any additional heating and then allowed to cool to room temperature.

The release coated substrate 3 shown in FIG. 1 may be a polyethylene coated paper or one which optionally comprises a wax-like skim coat (not shown) which is coated directly on top of the entirety of the polyethylene layer. In the case where the release coated substrate 3 includes a wax-like skim coat, during label transfer it is acceptable for a small amount of the skim coat to be transferred (along with the transfer portion 1) onto the article being labeled since the transferred skim coat would not being readily discernable. Details of the composition of release coatings are disclosed, for example, in U.S. Pat. Nos. 4,935,300 and 6,099,944, both of which are incorporated herein by reference.

The abrasion resistant top coat 4 of the transfer portion 1 preferably is a phenoxy lacquer resin dissolved in a combination of methyl ethyl ketone and toluene, cross linked with a highly monomeric proprietary grade of methyl/butyl coetherified melamine-formaldehyde resin, and containing a blocked amine neutralized p-toluene sulfonic acid catalyst.

In accordance with a variation of this embodiment, the abrasion resistant topcoat 4 may be eliminated by substituting for it an abrasion resistant white or colored ink covering completely the area of the heat activatable adhesive. Such ink systems are described in U.S. Pat. No. 6,902,641, which is incorporated herein by reference.

The inks used in the design area (also called "design portion") of the transfer portion 1 preferably are comprised of polyamide-nitrocellulose resins dissolved in a combination of toluene, isopropyl alcohol, and n-propyl alcohol and, well dispersed in this solution, colored pigments such as titanium dioxide, carbon black, and phthalocyanine pigment blue 15:4.

The adhesive layer 6 of the transfer portion 1 preferably contains blends of ethylene-vinyl acetates, polyamides, and styrene free unsaturated polyesters, petroleum hydrocarbons, polyterpenes, terpene phenolics, acrylics, hydrogenated rosin and rosin ester tackifying resins, and a solid plasticizer such as glyceryl tribenzoate, dissolved in a combination of toluene, MEK, ethyl acetate, isopropyl alcohol, N-propyl alcohol, glycols and glycol ethers.

The proportions of which are selected to attain acceptable drying rates on the gravure, flexographic and silk screen printing station utilized. Adhesive layer 6 may also be a blend of ethylene-vinyl acetate tackified alone. Further, adhesive layer 6 may contain a different solid plasticizer such as dicyclohexyl phthalate, pentaerythritol tetrabenzoate, toluene sulfonamide-formaldehyde or mixtures thereof (with or without glyceryl tribenzoate). Preferably, adhesive layer 6 has a formulation that melts at temperatures between 140 and 217 degrees Fahrenheit.

An alternative ink system, formulated from the below listed components of the adhesive layer, may be utilized as a means of eliminating the separate adhesive layer 6.

Because of the strong, aggressive nature of the adhesive, the style of the label may be varied, as on circular containers, so that the side edges of the label may be spaced apart from one another, be in direct contact, or overlapped, normally referred to in the industry as a 360 degree wrap.

Table I below lists the components used in this disclosure.

TABLE I

| NAME | DESCRIPTION | COMPONENT | MANUFACTURER |
| --- | --- | --- | --- |
| Isopropyl Alcohol | Alcohol | Solvent | Shell Chemical |
| N-Propyl Alcohol | Alcohol | Solvent | Eastman |
| Ethyl Acetate | Ester | Solvent | Eastman |
| Methyl Ethyl Ketone | Ketone | Solvent | Shell Chemical |
| Toluene | Aromatic Hydrocarbon | Solvent | Shell Chemical |
| Adhesion Resin LTH | Styrene Free Unsaturated Polyester | Tackifying Resin | Degussa |
| PKHH | Phenoxy Resin | Thermoplastic Resin | InChem |
| Resimene 730 | Melamine-Formaldehyde Resin | Cross-linker | Resolution Performance Products |
| Nacure 4575 | Amine Salt of Aromatic Phosphate | Blocked Catalyst | King Industries |
| Versamid 940 | Polyamide Resin | Ink Binder | Cognis |
| Versamid 973 | Polyamide Resin | Ink Binder | Cognis |
| Lacquer Base | SS1/2 Nitrocellulose Solution | Ink Binder | Akzo Nobel Coatings |
| Kronos 2020 | Titanium Dioxide | Pigment | Kronos |
| Raven 1040 | Carbon Black | Pigment | Columbian Carbon |
| Daicolor-Pope DC-3160 | Phthalocyanine Blue 15:4 | Pigment | Daicolor-Pope |
| Sun 235-3023 | Napthol Red | Pigment | Sun Chemical |
| Elvax 40W | Vinyl Acetate-Ethylene Resin | Film Forming Resin | Dupont |
| Elvax 150 | Vinyl Acetate-Ethylene Resin | Film Forming Resin | Dupont |
| Elvax 205W | Vinyl Acetate-Ethylene Resin | Film Forming Resin | Dupont |
| Elvax 210W | Vinyl Acetate-Ethylene Resin | Film Forming Resin | Dupont |
| Elvax 240W | Vinyl Acetate-Ethylene Resin | Film Forming Resin | Dupont |
| Elvax 250 | Vinyl Acetate-Ethylene Resin | Film Forming Resin | Dupont |
| Elvax 265 | Vinyl Acetate-Ethylene Resin | Film Forming Resin | Eastman |

TABLE I-continued

| NAME | DESCRIPTION | COMPONENT | MANUFACTURER |
|---|---|---|---|
| Adhesion Resin LTH | Styrene Free Unsaturated Polyester | Tackifying Resin | Degussa |
| Sylvaprint 7002 | Terpene Phenolic | Tackifying Resin | Arizona Chemical |
| Sylvaprint 3525 | Terpene Phenolic | Terpene Phenolic | Arizona Chemical |
| Unirez 2291 | Polyamide Resin | Tackifying Resin | Arizona Chemical |
| Escorez 5320 | Aliphatic Hydrocarbon Resin | Aliphatic Hydrocarbon Resin | Exxon/Mobil Chemical |
| Escorez 1315 | Aliphatic Hydrocarbon Resin | Tackifying Resin | Exxon/Mobil Chemical |
| Benzoflex S-404 | Glyceryl Tribenzoate | Solid Plasticizer | Velsicol |
| Uniplex 250 | Dicyclohexyl Phthalate | Solid Plasticizer | Unitex |
| Uniplex 260 | Glyceryl Tribenzoate | Solid Plasticizer | Unitex |
| Uniplex 552 | Pentherythritol Tetrabenzoate | Solid Plasticizer | Unitex |
| Uniplex 600 | Toluene Sulfonamide-Formaldehyde | Solid Plasticizer | Unitex |
| Staybelite Ester 10 | Hydrogenated Resin Ester | Tackifying Resin | Hercules |
| Piccolyte S 85 | Polyterpene Resin | Tackifying Resin | Hercules |
| Piccolyte S 70 | Polyterpene Resin | Tackifying Resin | Hercules |
| Piccolyte S 115 | Polyterpene Resin | Tackifying Resin | Hercules |
| Staybelite Resin | Partially Hydrogenated Gum Rosin | Tackifying Resin | Hercules |

The following examples illustrate the suitable compositions of the present invention. These examples are not intended to limit the scope of the present invention in any way.

Example I

| Protective Top Coat | % by weight |
|---|---|
| Toluene | 26.0 |
| Methyl Ethyl Ketone | 44.5 |
| PKHH | 22.0 |
| Resimene 730 | 7.0 |
| Nacure 4575 | 0.5 |
| | 100.0 |

Example II

| White Ink | % by weight |
|---|---|
| Isopropyl Alcohol | 15.0 |
| Toluene | 7.0 |
| N-Propyl Alcohol | 7.0 |
| Versamid 940 | 18.0 |
| Kronos 2020 | 44.0 |
| ½ Sec. Nitrocellulose | 9.0 |
| | 100.0 |

Example III

| Black Ink | |
|---|---|
| Isopropyl Alcohol | 25.0 |
| Toluene | 14.0 |
| N-Propyl Alcohol | 13.0 |
| Versamid 940 | 18.0 |
| Raven 1040 | 12.0 |
| ½ Sec. Nitrocellulose | 18.0 |
| | 100.0 |

Example IV

| Blue Ink | |
|---|---|
| Isopropyl Alcohol | 21.0 |
| Toluene | 14.0 |
| N-Propyl Alcohol | 5.0 |
| Versamid 940 | 33.0 |
| DC3160 Pthalo Blue | 12.0 |
| ½ Sec. Nitrocellulose | 15.0 |
| | 100.0 |

Examples V through XIX shown in Table II below are examples of the flameless adhesives in accordance with the present invention, wherein percentages by weight are identified for the materials added in each of the examples.

TABLE II

|  | V | VI | VII | VIII | IX | X | XI | XII | XIII | XIV | XV | XVI | XVII | XVIII | XIX |
|---|---|---|---|---|---|---|---|---|---|---|---|---|---|---|---|
| Elvax 40W | 5 | 10 | 5 | 5 |  |  | 5 | 3 | 2 |  | 20 | 5 |  |  |  |
| Elvax 150 | 10 | 5 | 3 |  | 5 | 15 |  | 3 | 2 |  |  |  |  |  |  |
| Elvax 205W |  | 5 | 3 |  | 7 |  |  |  | 2 | 15 |  |  | 8 |  |  |
| Elvax 210 W |  |  | 3 |  | 4 |  |  |  |  |  |  |  | 8 |  |  |
| Elvax 240W |  |  |  |  |  |  |  |  |  |  |  |  |  | 5 | 5 |
| Elvax 250 |  |  |  |  |  |  |  |  |  |  |  | 5 |  |  | 5 |
| Elvax 265 |  |  |  |  |  |  |  |  |  |  |  | 5 |  | 10 | 5 |
| Toluene | 60 | 60 | 60 | 36 | 60 | 60 | 34 | 34 | 36 | 60 | 58 | 60 | 60 | 60 | 60 |
| Ethyl Acetate | 20 | 15 | 20 | 12 | 18 | 20 | 10 | 10 | 8 | 20 | 18 | 20 | 20 | 20 | 20 |
| Isopropyl Alcohol |  |  |  | 24 |  |  | 23 | 23 | 25 |  |  |  |  |  |  |
| Staybelite Ester 10 | 5 |  | 2 |  |  |  |  |  |  |  | 2 |  |  | 2 | 2 |
| Escorez 5320 |  | 5 | 2 |  |  | 5 |  |  |  |  |  |  |  |  |  |
| Escorez 1315 |  |  | 2 |  |  |  |  |  |  |  |  |  |  |  |  |
| Sylvaprint 3523 |  |  |  |  | 3 |  | 3 | 3 | 3 | 5 | 2 |  |  | 1 | 1 |
| Sylvaprint 7002 |  |  |  | 6 | 3 |  | 8 | 8 | 8 |  |  | 5 | 4 | 2 | 2 |
| Unirez 2291 |  |  |  | 7 |  |  | 9 | 8 |  |  |  |  |  |  |  |
| Versamide 973 |  |  |  |  |  |  |  |  | 8 |  |  |  |  |  |  |
| Benzoflex S-404 |  |  |  | 8 |  |  |  | 8 |  |  |  |  |  |  |  |
| Ketjenflex MH |  |  |  |  |  |  | 8 |  | 6 |  |  |  |  |  |  |
| Adhesion Resin LTH |  |  |  | 2 |  |  |  |  |  |  |  |  |  |  |  |

In the above examples the materials are added while mixing until the resins and film formers are dissolved. In manufacturing the inks, the pigments are added to the dissolved resins and dispersed well. As noted, in examples V through XIX the solid components of the adhesive are pre-dissolved and then blended while mixing.

The present invention achieves the desired characteristics of improved heat activation, adhesion and resistance properties by utilizing solvent solutions of blends of ethylene-vinyl acetate polymer resins tackified with one or more polyamides, polyesters, polyterpenes, terpene phenolics, acrylics, aliphatic hydrocarbon resins, hydrogenated rosins and rosin esters and mixture thereof and preferably plasticized with one or more solid plasticizers.

The liquid coatings are sufficiently low in viscosity and of suitable evaporation rates so as to be applied and dried by gravure application on a commercial press.

The dried films of these products have excellent interlayer adhesion and, in the case of the adhesive coating, are of sufficiently low softening point, high molten wet tack, non-blocking in roll form of the printed labels, and when melted and placed in contact with the container to be labeled provide excellent adhesion to the polyolefin surfaces when the labeled article has been cooled to room temperature.

The use of low melt viscosity tackifiers and solid plasticizers improves the reliability of the adhesive bond to the substrate by providing enhanced rheological and absorptive properties thereby removing the weak boundary layer resulting from localized concentration or migration of silicone or fatty acid amide mold release or slip agents present on the plastic substrate to which the label is transferred by heat and bonded to by contact pressure.

The blends of tackifier resins are used to minimize loss of tack and peel strength caused by tackifier crystallization on aging.

Colored inks are used as interlayers between the abrasion-resistant protective topcoat and adhesive layers. These inks may be formulated from one or more organic or inorganic pigments dispersed and ground in a pigment grinding resin dissolved in appropriate solvent blends selected to provide suitable drying rates when applied on the protective topcoat on the printing press. The heat activatable adhesive is applied over the dried ink and topcoat layers prior to being wound in roll form for subsequent application to the polyolefin substrate as a label.

In the description of the various embodiments of the present invention as described, it is to be understood that certain terms used herein, such as "on" or "over", when used to denote the relative positions of two or more layers of a heat transfer label, are primarily used to denote such relative positions in the context of the way in which these layers are situated prior to transfer of the transfer portion of the label to an article since, after transfer, the arrangement of the layers is inverted as those layers which were furthest removed from the associated support sheet are now closest to the labeled article.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A method of manufacturing a heat transfer label, the steps of:
   providing a support portion;
   providing an abrasion resistant topcoat over the support portion;
   providing an ink layer over the topcoat; and
   providing an adhesive layer of a solvent-based adhesive having a blend of ethylene-vinyl acetate polymers over the ink layer, the adhesive layer having no chlorinated polyethylene resin,
   the adhesive layer, the ink layer and the topcoat representing a transfer portion adapted to be transferred from the support portion to an article,
   wherein the step of providing an adhesive layer comprises providing an adhesive layer of a solvent-based adhesive having a blend of ethylene-vinyl acetate polymers tackified with at least one of polyterpenes, terpene phenolics, acrylics, and aliphatic hydrocarbon resins.

2. The method of claim 1, wherein the step of providing an ink layer comprises providing an abrasion resistant ink of at least one color completely covering the topcoat.

3. The method of claim 1, wherein the step of providing an adhesive layer comprises providing an adhesive layer including a solid plasticizer.

4. The method of claim 3, wherein the solid plasticizer includes at least one of Glyceryl Tribenzoate, Dicyclohexyl Phthalate, Pentaerythritol Tetrabenzoate, and Toluene Sulfonamide-formaldehyde.

5. The method of claim 1, wherein the transfer portion is adapted to be transferred to an article wherein edges of the transferred portion, after transfer to the article, are suitable to be spaced apart from one another, in direct contact, or overlapped with one another.

6. The method of claim 1, wherein the step of providing an adhesive layer comprises providing a solvent based adhesive having a blend of ethylene-vinyl acetate polymers plasticized with a solid plasticizer, adapted to melt at temperatures substantially between 140 degrees and 217 degrees Fahrenheit, and dissolved in a blend of solvents adapted to dissolve the components and to obtain sufficiently low viscosity for application by gravure printing and coating equipment.

7. The method of claim 1, wherein the step of providing an adhesive layer comprises providing an adhesive layer of a solvent-based adhesive having a blend of only ethylene-vinyl acetate polymers over the ink layer.

8. A method of manufacturing a heat transfer label, comprising the steps of:
providing a support portion;
providing an abrasion resistant topcoat over the support portion;
providing an ink layer over the topcoat; and
providing an adhesive layer of a solvent-based adhesive having a blend of ethylene-vinyl acetate polymers over the ink layer, the adhesive layer having no chlorinated polyethylene resin,
the adhesive layer, the ink layer and the topcoat representing a transfer portion adapted to be transferred from the support portion to an article,
wherein the step of providing an adhesive layer comprises providing an adhesive layer containing the blend of ethylene-vinyl acetate polymers with a combination of tackifiers selected from the group consisting of polyterpenes, terpene phenolics, acrylics, and aliphatic hydrocarbon resins, and mixtures thereof.

9. A method of manufacturing a heat transfer label, comprising the steps of:
providing a support portion;
providing an abrasion resistant topcoat over the support portion;
providing an ink layer over the topcoat, the ink layer being an abrasion resistant ink prepared from a binder system and formulated from components of a solvent-based adhesive having a blend of ethylene-vinyl acetate polymers,
the ink layer and the topcoat, without a separate adhesive layer over the ink layer, representing a transfer portion adapted to be transferred from the support portion to an article.

* * * * *